J. Broughton,
Lubricator.

N°45,694.      Patented Jan. 3, 1865.

Witnesses.
M. M. Livingston.
Jas. P. Hall.

Inventor.
John Broughton

UNITED STATES PATENT OFFICE.

JOHN BROUGHTON, OF NEW YORK, N. Y.

IMPROVEMENT IN LUBRICATORS.

Specification forming part of Letters Patent No. 45,694, dated January 3, 1865.

*To all whom it may concern:*

Be it known that I, JOHN BROUGHTON, of the city, county, and State of New York, have invented certain new and useful Improvements in Lubricators; and I do hereby declare that the following is a full, clear, and exact description of thereof, which will enable those skilled in the art to make and use the same, reference being had to the accompanying drawings, forming part of this specification, in which—

Figure 1:
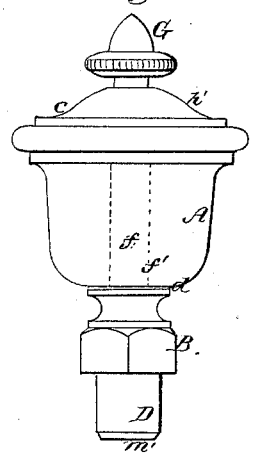
Figure 2:
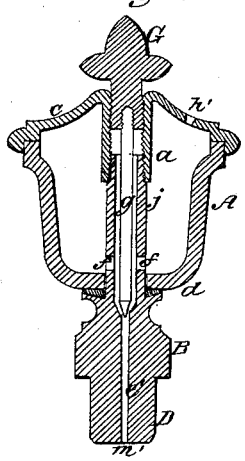
Figure 7:
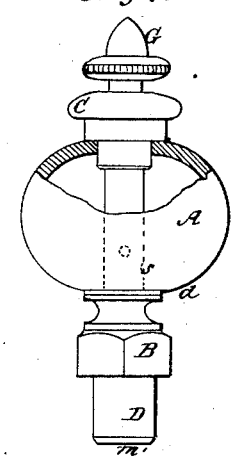
Figure 3:
Figure 4:
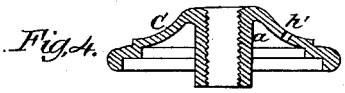
Figure 5:
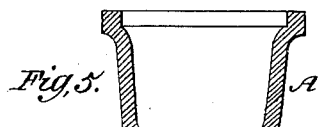
Figure 6:
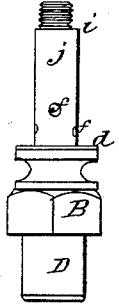

Figure 1 is an elevation, and Fig. 2 a vertical section, of my lubricator. Figs. 3, 4, 5, and 6 represent the parts detached. Fig. 7 shows modifications in the form of the globe and other parts.

Similar letters of reference indicate corresponding parts.

This invention relates to certain improvements in oil-cups or lubricators whereby the cap and shank are firmly and rigidly connected together by continuing said shank upward in the form of a central spindle admitting of the use of a detachable or independent reservoir of glass or other transparent material of any desired shape without danger of fracture by expansion or contraction, and enabling me to produce at small cost a superior article, which combines the features of a transparent body and a graduating feed.

A is the reservoir or oil-cup; B, the shank which takes the form above the shoulder $d$ of a spindle, passing upward through a hole in the bottom of the reservoir A.

C is the cap or cover of the reservoir. The shank B has a shoulder, $d$, formed on the upper end of its base, on which rests a washer of compressed cork. The cap C has a neck, $a$, extending down into the reservoir, to which neck the upper end of the shank B is attached by a screw-joint, as seen in Fig. 2. When this joint is united, the cap is brought firmly down upon the top of the reservoir, which is by this means compressed between the cap and the washer or shoulder on the upper end of the base of the shank. The shank B $j$ is made hollow to receive the valve-rod $g$, the conical point of which forms a valve in connection with the conical bottom $e$ of the chamber made through the upper part of the shank. This chamber connects at the lower end of the conical bottom $e$ with a smaller passage, $e'$, made through the shank B, the one passage being a continuation of the other, and the lower one, $e'$, being closed and opened by the valve-rod $g$, as it rests upon or is lifted off its valve-seat $e$. The valve-rod is smaller in diameter than the chamber into which it passes. Two or more lateral passages, $f f$, are made through the sides of the shank or spindle B $j$, at or near the bottom of the reservoir, to make a communication between it and the central feed-passage.

G is a thumb screw or nut which serves to close the central orifice or neck, $a$, of the cap, and also to operate the valve-rod $g$, which is rigidly secured to it, as seen in the Fig. 2.

The operation of the parts is as follows: The thumb-screw and valve-rod being withdrawn, the oil or lubricating material is fed in at the central orifice in cap C, and passes through the lateral holes $f$ into the reservoir, the air escaping at the orifice $h$ in the cap. The thumb-screw being then replaced and screwed down, the lower end of the valve-rod will close the discharge passage at $e$ and the oil will be retained in the reservoir. Then by slightly turning or unscrewing the thumb-screw G the valve will be raised from its seat and the oil will pass from the reservoir into the chamber of the hollow spindle or shank B $j$ through the holes $f$, and thence into the passage $e'$ and be discharged at $m'$. By unscrewing the nut G more or less the flow of the oil will be graduated to feed fast or slow, so as to lubricate the part to which it is attached without waste. By screwing down the nut G close, the discharge-passage will be closed and the oil retained in the cup when the machinery is at rest.

F, Fig. 7, shows my lubricator partly in section in a modified form, the transparent or other reservoir being of a globular shape, by which method of construction the cap C can be made smaller than when the form of cup shown in Fig. 2 is used, and the brass or metallic parts of the lubricator may be reduced to the minimum quantity and the cost decreased.

The advantages of my improvements are as follows: First, they enable me to make a simple combination of parts whereby a reservoir of glass or other transparent material may be held in position in such manner that it is free to contract and expand independently of the brass or metallic portions of the lubricator, while the metallic parts are free to contract and expand without fracturing the reservoir; second, by screwing the shank and spindle B j into the cap until the shoulder i comes lightly into contact with the under side of the neck a, a definite distance (which cannot be reduced, which is somewhat greater than the depth of glass reservoir) is left between the cap and the shoulder d of the shank, and the threads of a screw may be chased on the shank of the lubricator to fit it to the position it is to occupy, and it may also be taken apart and put together again by any one of ordinary intelligence without the possibility of fracturing the glass reservoir by compressing or screwing it together too tightly; third, should the glass reservoir become fractured, by simply unscrewing the shank B j from the cap it can be replaced by a new one in a few moments and at a trifling cost, thus making the article again equal to new; fourth, by the arrangement shown a simple article is produced which combines the transparent and graduating features at a small cost.

I do not confine myself to making the reservoir of glass or other transparent material, as by the arrangement of parts shown said reservoir, together with the cap C, may be made of sheet-brass or other material by stamping or spinning, and while retaining the graduating feature a good article can be manufactured.

What I claim as new, and desire to secure by Letters Patent, is—

1. The arrangement of the shank and spindle B j and cap C, in combination with a detachable reservoir, substantially as described.

2. Combining and arranging the detachable reservoir, the shank and spindle B j, and cap C in such manner that said shank and cap are held firmly and rigidly together independently of the reservoir, said reservoir being free to contract and expand independently of the connection between the shank and cap, substantially as described.

JOHN BROUGHTON.

Witnesses:
M. M. LIVINGSTON,
C. L. TOPLIFF.